US005484677A

United States Patent [19]

Inaba

[11] Patent Number: 5,484,677

[45] Date of Patent: Jan. 16, 1996

[54] MICROCAPSULE AND MICROCAPSULE TONER

[75] Inventor: Yoshihiro Inaba, Minami-ashigara, Japan

[73] Assignee: Fuji Xerox Co., Ltd., Tokyo, Japan

[21] Appl. No.: 974,114

[22] Filed: Nov. 10, 1992

[30] Foreign Application Priority Data

Nov. 15, 1991 [JP] Japan .................................... 3-328276

[51] Int. Cl.[6] ............................ G03G 9/093; G03G 1/72; B01J 13/16; B01J 13/18

[52] U.S. Cl. ...................... 430/110; 264/4.7; 428/402.21; 428/402.22; 428/402.24; 430/138

[58] Field of Search ........................ 428/402.21, 402.22, 428/402.24; 430/138, 110

[56] References Cited

U.S. PATENT DOCUMENTS

| | | | |
|---|---|---|---|
| 3,891,572 | 6/1975 | Moody et al. | 428/402.22 X |
| 4,465,755 | 8/1984 | Kiritani et al. | 430/111 |
| 4,761,358 | 8/1988 | Hosei et al. | 430/109 |
| 4,837,107 | 6/1989 | Axelsson et al. | 430/138 |
| 4,869,990 | 9/1989 | Hosei | 430/110 |
| 4,980,257 | 12/1990 | Anno et al. | 430/138 X |
| 5,215,851 | 6/1993 | Tomita et al. | 430/138 X |

FOREIGN PATENT DOCUMENTS

| | | |
|---|---|---|
| 42-446 | 1/1967 | Japan . |
| 49-45133 | 12/1974 | Japan . |
| 50-22507 | 7/1975 | Japan . |
| 57-45558 | 3/1982 | Japan . |
| 57-202547 | 12/1982 | Japan . |
| 58-66948 | 4/1983 | Japan . |
| 58-145964 | 8/1983 | Japan . |
| 38-19474 | 9/1983 | Japan . |
| 59-148066 | 8/1984 | Japan . |
| 59-162562 | 9/1984 | Japan . |
| 60-173552 | 9/1985 | Japan . |
| 62-227161 | 10/1987 | Japan . |
| 62-227162 | 10/1987 | Japan . |
| 63-27853 | 2/1988 | Japan . |
| 63-27854 | 2/1988 | Japan . |
| 63-49766 | 3/1988 | Japan . |
| 63-163373 | 7/1988 | Japan . |
| 2-31381 | 7/1990 | Japan . |

*Primary Examiner*—Richard D. Lovering
*Attorney, Agent, or Firm*—Oliff & Berridge

[57] ABSTRACT

A microcapsule and a microcapsule toner each comprising a core material and an outer shell, in which the outer shell contains a vinyl polymer and a polymer comprising at least two monomers copolymerizable with each other on the surface of the core material, and a process for producing a microcapsule, which comprises the steps of: emulsifying a lipophilic core material in an aqueous medium; and causing at least two monomers copolymerizable with each other to copolymerize, in the presence of a vinyl polymer, on the surface of the oil droplets of the core material in the resulting emulsion to form an outer shell.

14 Claims, No Drawings

MICROCAPSULE AND MICROCAPSULE TONER

FIELD OF THE INVENTION

The present invention relates to a microcapsule, a microcapsule toner, and a process for producing the same.

BACKGROUND OF THE INVENTION

Various proposals have hitherto been made on a microcapsule composed of a core material and an outer shell covering the core material. In applying microcapsules to electrophotographic toners, it is necessary to impart charge controlling properties to the capsule shell so as to visualize an electrostatic latent image. For this purpose, it has been proposed to apply a polymer containing a charge control agent to toner particles by spray drying or coating under heating or under pressure as disclosed in JP-A-57-202547, JP-A-63-27853, and JP-A-63-27854 (the term "JP-A" as used herein means an "unexamined published Japanese patent application").

However, the spray drying process involves a disadvantage that a plurality of toner particles are covered with a spray coating layer to produce large toner particles, which requires sieving to remove such large particles. After sieving, the yield of the toner of desired size is low. In addition, a large quantity of an organic solvent should be used, giving rise to a safety problem. The process of coating a polymer through heat fusion induces agglomeration of toner particles, also producing large toner particles. The process of coating a polymer under pressure is applicable to heat-fixable toner particles having sufficient hardness. However, where this process is applied to pressure-fixable capsule toners having a liquid core, the capsules would be destroyed.

JP-A-60-173552 describes a process for producing a toner, in which a coat comprising a binder resin containing a colorant, a magnetic powder or a conductive substance is formed on toner core particles by means of a jet mill. JP-A-63-49766 describes a process comprising mixing toner particles and a thermoplastic resin under strain to thereby coat the toner particles with the resin. Similarly to the above-mentioned cases, these processes are applicable to hard toner particles, for example, heat-fixable toners. However, when applied to capsule toners having a liquid core for pressure fixing, they result in destruction of the capsules.

JP-A-57-45558 proposes a process for producing a toner, in which toner core particles formed by polymerization are dispersed in an aqueous latex solution and a water-soluble inorganic salt is added to the dispersion to cause fine particles to be sedimented on the surface of the toner core particles thereby forming a coating layer. However, since the coating layer is formed of a deposit of fine particles on the core material, it has poor adhesion to the core material and poor covering power. Moreover, charging properties of the resulting toner are influenced by the surface active agent or inorganic salt remaining on the toner particles and are therefore greatly dependent on the environmental conditions. In particular, the chargeability is reduced under a high temperature and high humidity condition. JP-A-62-227161 and JP-A-62-227162 disclose a process for producing a capsule toner, in which a charge controlling polymer is formed by graft polymerization on the shells of microcapsules separately prepared by interfacial polymerization. However, since microcapsules prepared by utilizing interfacial polymerization have low properties of initiating graft polymerization, the above process requires a two-stage treatment; that is, a monomer having a plurality of vinyl groups per molecule is bonded to the capsule shell in the presence of a catalyst, e.g., a cerium salt, and then a monomer having charge controlling ability is graft-polymerized starting at the vinyl groups thus introduced.

SUMMARY OF THE INVENTION

An object of the present invention is to provide a microcapsule in which the core material is sufficiently covered with the outer shell and which can easily be provided with a special function, such as charge controllability.

Another object of the present invention is to provide a microcapsule toner utilizing the above-mentioned microcapsules.

A further object of the present invention is to provide a process for producing the above-mentioned microcapsule or microcapsule toner, which produces capsules with no scatter in size in high yield without causing any safety or hygiene problem, which is suitable for production of a microcapsule containing a liquid core, which needs no special apparatus to carry out, and which enables encapsulation simultaneously with a step for imparting charge controllability to the microcapsule to produce a microcapsule with charging properties less dependent on environmental conditions.

Other objects and effects of the present invention will be apparent from the following description.

As a result of extensive investigations, it has now been found that the above objects of the present invention are accomplished by a microcapsule whose outer shell contains a vinyl polymer and a polymer comprising at least two copolymerizable monomers.

The present invention relates to a microcapsule and a microcapsule toner each comprising a core material and an outer shell, in which the outer shell contains a vinyl polymer and a polymer comprising at least two monomers copolymerizable with each other on the surface of the core material.

The present invention also relates to a process for producing a microcapsule, which comprises the steps of: emulsifying a lipophilic core material in an aqueous medium; and causing at least two monomers copolymerizable with each other to copolymerize, in the presence of a vinyl polymer, on the surface of the oil droplets of the core material in the resulting emulsion to form an outer shell.

The present invention also relates to a microcapsule toner comprising a core material and an outer shell, said outer shell containing a vinyl polymer having active hydrogen and a polymer comprising at least two monomers copolymerizable with each other on the surface of said core material, said vinyl polymer and said polymer being chemically bonded to each other.

DETAILED DESCRIPTION OF THE INVENTION

The term "vinyl polymer" used herein means a polymer obtained by polymerization of addition-polymerizable monomer(s). The vinyl polymer which can be used in the present invention may include those obtained by emulsion polymerization, soap-free polymerization, suspension polymerization, solution polymerization, and the like. The vinyl polymer used in the present invention is preferably in the form of fine particles.

Any of vinyl monomers may be used as the addition-polymerizable monomers such as those can be emulsion-polymerized. Examples of the vinyl monomers include those described in *Kobunshi Data Handbook* (Polymer Data Handbook), edited by The Society of Polymer Science, Japan, published by Baifukan, Japan, such as (meth)acrylic monomers, (meth)acrylic acid, methyl (meth)acrylate, ethyl (meth)acrylate, butyl (meth)acrylate, 2-ethylhexyl (meth-)acrylate, lauryl (meth)acrylate, stearyl (meth)acrylate, cyclohexyl (meth)acrylate, benzyl (meth)acrylate, 2-hydroxyethyl (meth)acrylate, 2-hydroxypropyl (meth)acrylate, allyl (meth)acrylate, dimethylaminoethyl (meth)acrylate, diethylaminoethyl (meth)acrylate, aminoethyl (meth)acrylate, aminoethyl (meth)acrylate hydrochloride, dimethylaminoethyl (meth)acrylate methylchloride, trifluoroethyl (meth)acrylate, glycidyl (meth)acrylate, tetrahydrofurfuryl (meth)acrylate, ethylene glycol di(meth)acrylate, 1,3-butylene glycol di(meth)acrylate, trimethylolpropane tri-(meth)acrylate, (meth)acrylic acid chloride, and (meth)acrylonitrile; (meth)acrylamide monomers, e.g., (meth)acrylamide, N-methyl(meth)acrylamide, N-ethyl-(meth)acrylamide, N-butyl(meth)acrylamide, N-benzyl-(meth)acrylamide, N-phenyl(meth)acrylamide, N,N-dimethyl(meth)acrylamide, N-hydroxymethyl(meth)acrylamide, N,N'-methylenebisacrylamide, aminoethyl(meth)acrylamide, aminoethyl-(meth)acrylamide hydrochloride, diethylaminoethyl-(meth)acrylamide, dimethylaminoethyl(meth)acrylamide, and N-acryloylglycineamide; styrene monomers, e.g., styrene, methylstyrene, chloromethylstyrene, aminostyrene, formylstyrene, hydroxystyrene, vinylbenzoic acid, vinylbenzoic esters, styrenesulfonic acid, sodium styrenesulfonate, styrenesulfonic esters, an alkoxystyrene, and divinylstyrene; vinyl ester monomers, e.g., vinyl acetate, vinyl chloroacetate, vinyl trifluoroacetate, vinyl propionate, vinyl pivalate, vinyl laurate, vinyl stearate, and vinyl formate; vinyl ether monomers, e.g., methyl vinyl ether, ethyl vinyl ether, butyl vinyl ether, 2-ethylhexyl vinyl ether, methoxyethyl vinyl ether, and diethylene glycol divinyl ether; vinyl ketone monomers, e.g., methyl vinyl ketone, methyl isopropenyl ketone, benzylideneacetone, benzylideneacetophenone, diisopropylideneacetone, 2-cyclopenten-1-one, acrolein, methacrolein, crotonaldehyde, and cinnamaldehyde; maleic anhydride and derivatives thereof; maleic esters; maleinamic acid and derivatives thereof; maleimide and derivatives thereof; and nitrogen-containing vinyl monomers, e.g., vinylpyrrolidone, vinylpyridine, vinylimidazole, 1-vinyl-2-methylimidazole, vinylcarbazole, N-vinyl-2-caprolactam, and N-vinylphthalimide. These vinyl monomers may be used either individually or in combination of two or more thereof. In the latter case, the monomers may be reacted either all at once or successively.

The term "(meth)acrylate" and the like used herein means "acrylate and methacrylate" and the like.

The vinyl polymer to be used in the present invention preferably includes those prepared in an aqueous medium by using a polymerization initiator in the presence of a surface active agent or a dispersion stabilizer, such as polyvinyl alcohol and a cellulose derivative, or in the absence of a surface active agent or a dispersion stabilizer.

Where the microcapsule of the present invention is used as an electrophotographic toner, the vinyl monomer(s) is/are preferably selected from those having charge controlling properties. Vinyl monomers with charge controlling properties can be selected from the above-enumerated examples of the vinyl monomers. For example, for the production of a positively chargeable toner, amino-containing (meth)acrylates or quaternary ammonium salt-containing (meth)acrylates can be used as vinyl monomers. For the production of a negatively chargeable toner, (meth)acrylic acid, (meth)acrylsulfonic acid, fluorine-containing (meth)acrylates, and (meth)acrylonitrile can be used as vinyl monomers. These monomers may be used as a mixture of two or more of them. From the standpoint of obtaining fine polymer particles as a preferred embodiment, it is desirable that highly water-soluble vinyl monomers be used in combination with relatively sparingly water-soluble vinyl monomers. Further, it is preferable that the vinyl polymer should be a polymer obtained by soap-free polymerization using no surface active agent from the standpoint of chargeability stability against environmental conditions. The fine particles of the vinyl polymer have a particle size generally of from 0.01 to 10 μm, preferably from 0.05 to 5 μm, and more preferably from 0.1 to 1 μm.

In a preferred embodiment of the present invention, the vinyl polymer have active hydrogen. It is further preferred that a functional group having active hydrogen be present on the surface of the vinyl polymer fine particles. Examples of the functional group having active hydrogen includes a carboxyl group, an amino group, a hydroxyl group, a mercapto group and amidino groups, and an amino group, a hydroxyl group and an amidino group are particularly preferred. The functional group may be present at the terminal or in the main chain of the vinyl polymer molecule. It may be in the side chain as a pendant group.

The functional group having active hydrogen can be introduced into the vinyl polymer by any known method, such as a process of using a polymerization initiator having a desired functional group or a salt thereof, a process of using a vinyl monomer having a desired functional group or a salt thereof, or a process comprising once introducing a precursor of a desired functional group into a polymer and then converting the precursor to the corresponding functional group having active hydrogen through chemical modification. Where a polymerization initiator or vinyl monomer having a salt structure is employed, it is preferable to convert it to the corresponding functional group having active hydrogen by a post treatment. These processes may be used in combination.

The polymer constituting the outer shell is not particularly limited if it comprises at least two monomers copolymerizable with each other on the surface of the core material. Examples of the polymer constituting the outer shell include those comprising at least one of polyurea, polyurethane, polyamide, an epoxy polymer, polyester, an epoxyurea polymer and an epoxyurethane polymer. Preferred examples thereof include those comprising at least one of polyurea, polyurethane, polyamide, and an epoxy polymer. It is also preferred that the polymer has a polyurea structure.

The microcapsule of the present invention can be produced by internal in-situ polymerization or interfacial polymerization. The internal in-situ polymerization is a process in which a first shell-forming monomer and a second shell-forming monomer both present in oil droplets of the core material are reacted in the inside and/or the interface of the oil droplets to form a capsule shell as disclosed, e.g., in JP-B-49-45133 and JP-B-50-22507 (the term "JP-B" as used herein means an "examined published Japanese patent application"). The interfacial polymerization is a process in which one shell-forming monomer present in a solvent and the other shell-forming monomer present in oil droplets of the core material are reacted on the interface of the oily droplets to form a capsule shell as disclosed, e.g., in JP-B-38-19574, JP-B-42-446, JP-B-2-31381, JP-A-58-66948, JP-A-59-148066, and JP-A-59-162562. The capsule shell formed by these processes generally comprises at least one selected from polyurea, polyurethane, polyamide and an epoxy polymer, and preferably has a polyurea structure.

The process for producing the microcapsule according to the present invention is characterized in that the polymerization, preferably the above-mentioned internal in-situ polymerization or interfacial polymerization, is carried out in the presence of vinyl polymer fine particles. In a particularly preferred embodiment, where fine particles of a vinyl polymer having active hydrogen on the surface thereof is used in the internal in-situ polymerization or interfacial polymerization, there can be formed a capsule shell comprising a mixture of the vinyl polymer and the polymer constituting the outer shell, such as polyurea, polyurethane, polyamide and an epoxy polymer, chemically bonded to the vinyl polymer. The vinyl polymer present in the capsule shell may still have the form of fine particles, or the form of fine particle may be changed or disappear by dissolving in the polymer constituting the outer shell.

The at least two monomers copolymerizable with each other are not particularly limited if they are capable of forming the outer shell of the microcapsule.

Examples of one of the monomers (first shell-forming monomer) include water; polyols, e.g., ethylene glycol, 1,4-butanediol, catechol, resorcinol, hydroquinone, o-dihydroxymethylbenzene, 4,4'-dihydroxydiphenylmethane, and 2,2-bis(4-hydroxyphenyl)propane; polyamines, e.g., ethylenediamine, tetramethylenediamine, hexamethylenediamine, phenylenediamine, diethylenetriamine, triethylenetetramine, diethylaminopropylamine, and tetraethylenepentamine; and piperazine compounds, e.g., piperazine, 2-methylpiperazine, and 2,5-dimethylpiperazine. In either of the above-mentioned two processes, at least one of the second shell-forming monomers (e.g., isocyanate compounds, acid halides, and epoxy compounds) undergoes a chemical reaction with the fine vinyl polymer particles having active hydrogen, whereby the fine vinyl polymer particles are entrapped by the polymer formed (i.e., polyurea, polyurethane, polyamide, or an epoxy polymer) while being chemically bonded to the polymer formed.

Preferred examples of the other of the monomers (second shell-forming monomer) include an isocyanate compound, an acid halide, and an epoxy compound. Where the microcapsule is used as an electrophotographic toner, the second shell-forming monomers preferably contain at least an isocyanate compound from the standpoint of electrical resistance. Specific examples of the isocyanate compound include diisocyanate compounds, such as m-phenylene diisocyanate, tolylene diisocyanate, diphenylmethane diisocyanate, 3,3'-dimethyl-diphenyl-4,4'-diisocyanate, 3,3'-dimethyl-diphenylmethane-4,4'-diisocyanate, xylylene diisocyanate, naphthalene diisocyanate, and hexamethylene diisocyanate; and polyisocyanate compounds known as a burette type, an adduct type, or an isocyanurate type. Specific examples of the acid halides include dibasic acid halides, such as adipoyl dichloride, phthaloyl dichloride, terephthaloyl dichloride, and 1,4-cyclohexanedicarbonyl chloride. Specific examples of the epoxy compounds are those known as a bisphenol A type, a resorcin type, a bisphenol F type, a tetraphenylmethane type, a novolak type, a polyalcohol type, a polyglycol type, and a glycerine triether type. These monomers may be used as a mixture thereof.

In the process of the present invention, one of the monomers may be present in the lipophilic core material and the other monomer may be presenting the aqueous medium. Alternatively, all of the monomers may be present in the lipophilic core material.

Preferred embodiments of the process for producing the microcapsule of the present invention include the following two processes:

One is a process comprising emulsifying an oily mixture containing at least one monomer selected from the group consisting of an isocyanate compound, an acid halide, and an epoxy compound as a second shell-forming monomer and a core material in an aqueous medium in the presence of fine particles of a vinyl polymer having active hydrogen on at least the surface thereof and conducting interfacial polymerization on the interface of the oil droplets of the resulting emulsion in the presence of the above-mentioned vinyl polymer fine particles to form a capsule shell.

The other process comprises emulsifying an oily mixture containing at least one monomer selected from the group consisting of an isocyanate compound, an acid halide, and an epoxy compound as a second shell-forming monomer and a core material in an aqueous medium, adding fine particles of a vinyl polymer having active hydrogen on at least the surface thereof to the resulting emulsion, and conducting interfacial polymerization on the surface of the oil droplets of the emulsion to form a capsule shell. In either process, a first shell-forming monomer may be charged together with the core material into the inside of the oil droplets, or in the outside of the oil droplets, i.e., in the aqueous medium.

The core material is not particularly limited. Where the microcapsule is used as a toner, the core material mainly comprises a pressure fixable component in the case of a pressure fixable toner or a heat fixable component in the case of a heat fixable toner. In the case of pressure fixable toners, the core material preferably comprises a binder resin, a high boiling point solvent capable of dissolving the binder, and a colorant, or it preferably comprises a soft solid substance and a colorant. If desired, the colorant may be displaced with a magnetic powder. For the purpose of improving fixing properties, additives, such as silicone oil, may also be added. The high boiling point solvent capable of dissolving the binder resin may be used in combination with a high oiling point solvent incapable of dissolving the binder resin. The kinds or compounding ratio of the core components are preferably altered depending on whether the toner is pressure fixable or heat fixable.

The core material preferably contains a low boiling point solvent capable of dissolving or swelling the outer shell. By using a low boiling point solvent in the core material, the vinyl polymer fine particles are dissolved in the polymer constituting the outer shell.

The binder resins which can be used in the core material are conventional. Specific examples of the binder resins include polyacrylates, e.g., polymethyl acrylate, polyethyl acrylate, polybutyl acrylate, poly-2-ethylhexyl acrylate, polylauryl acrylate, and polystearyl acrylate; polymethacrylates, e.g., polymethyl methacrylate, polybutyl methacrylate, polyhexyl methacrylate, poly-2-ethylhexyl methacrylate, polylauryl methacrylate, and polystearyl methacrylate; a copolymer of a styrene monomer and a (meth)acrylic ester, polyvinyl acetate, polyvinyl propionate, polyvinyl butyrate, ethylene polymers, e.g., polyethylene and polypropylene, and copolymers thereof; styrene copolymers, e.g., a styrene-butadiene copolymer, a styrene-isoprene copolymer, and a styrene-maleic acid copolymer; polyvinyl ether, polyvinyl ketone, polyester, polyamide, polyurethane, rubbers, epoxy resins, polyvinyl butyral, rosin, modified rosin, terpene resins, phenolic resins, and so on, either individually or as a mixture thereof. Polymerization for preparing the binder resin may be preceded by encapsulation.

The high boiling point solvents for dissolving the binder resin include oily solvents having a boiling point of 140° C. or higher, and preferably 160° C. or higher. Such high boiling point solvents may be chosen from those listed in *Modern Plastics Encyclopedia*, Chapter of "Plasticizers" (1975–1976) or those known as a core material for pressure fixable capsule toners as disclosed in JP-A-58-145964 and JP-A-63-163373. Specific examples of the high boiling point solvents include phthalic esters (e.g., diethyl phthalate, dibutyl phthalate), aliphatic dicarboxylic acid esters (e.g., diethyl malonate, dimethyl oxalate), phosphoric esters (e.g., tricresyl phosphate, trixylyl phthalate), citric esters (e.g., o-acetyltriethyl citrate), benzoic esters (e.g., butyl benzoate, hexyl benzoate), fatty acid esters (e.g., hexadecyl myristate, dioctyl adipate), alkylnaphthalenes (e.g., methylnaphthalene, dimethylnaphthalene, monoisopropylnaphthalene, diisopropylnaphthalene), alkyldiphenyl ethers (e.g., o-, m-, or p-methyldiphenyl ether), higher fatty acid or aromatic sulfonic acid amides (e.g., N,N-dimethyllauroamide, N-butylbenzenesulfonamide), trimellitic esters (e.g., trioctyl trimellitate), diarylalkanes (e.g., diarylmethanes, e.g., dimethyldiphenylmethane; diarylethanes, e.g., 1-phenyl-1-methylphenylethane, 1-dimethylphenyl-1-phenylethane, 1-ethylphenyl-1-phenylethane), and chlorinated paraffins. Where a polymer with a long-chain alkyl group, such as a homo- or copolymer of lauryl methacrylate, is used as a binder resin, an aliphatic saturated hydrocarbon or an organic solvent mainly comprising an aliphatic saturated hydrocarbon (e.g., "Isopar-G", "Isopar-H", or "Isopar-L" produced by Exxon Chemical) may be employed.

Examples of the colorants which can be used in the core material include inorganic pigments, such as carbon black, red oxide, Prussian blue, and titanium oxide; azo pigments, such as Fast Yellow, Disazo Yellow, pyrazolone red, Chelate Red, Brilliant Carmine, and Para Brown; phthalocyanine pigments, such as copper phthalocyanine and metal-free phthalocyanine; and condensed polycyclic pigments, such as flavanthrone yellow, dibromoanthrone orange, perylene red, quinacridone red, and dioxazine violet. Disperse dyes may also be employed. Further, the whole or a part of a black colorant may be replaced with a magnetic powder to obtain a magnetic one-component toner. Examples of usable magnetic powders are magnetite, ferrite, and single metals, e.g., cobalt, iron, and nickel, or alloys thereof. The magnetic powder may have been surface-treated with a coupling agent, e.g., a silane coupling agent or a titanate coupling agent, or an oil-soluble surface active agent, or may have been coated with an acrylic resin, a styrene resin, or an epoxy resin. The colorant or magnetic powder charged as one of the core components may be present, after encapsulation, on the interface between the core and the outer shell or within the outer shell.

The soft solid substances which can be used as a core component are not particularly limited as long as they have softness at room temperature and has fixability. In particular, a polymer having a glass transition temperature ranging from −60° to 50° C. or a mixture of such a polymer and other polymers is preferred.

In the preparation of a capsule toner, the thickness of the outer shell is preferably adjusted according to whether the toner is for pressure fixing or for heat fixing. Likewise, the kind of the constituting components or their compounding ratio may be varied accordingly.

A polymeric core component amongst the core components, such as the binder resin and the soft solid material, can be incorporated into a capsule by charging a separately prepared polymer together with other core components, a low boiling point solvent, and shell-forming components, followed by interfacial polymerization to form an outer shell, or after formation of an outer shell, driving out the low boiling point solvent to form a core. It is also possible that monomer(s) providing a polymeric component are charged and then, after interfacial polymerization to form an outer shell, polymerized in-situ to form a core.

The present invention is now illustrated in greater detail with reference to Examples, but it should be understood that the present invention is not construed as being limited thereto. All the parts and percents are by weight unless otherwise indicated.

EXAMPLE 1

Preparation of Vinyl Polymer

In a flask equipped with a stirring blade and a dropping funnel were charged 100 parts of dry methylene chloride and 60 parts of ethylenediamine, and the mixture was stirred in an ice bath. To the solution was slowly added 105 parts of methacrylic chloride through the dropping funnel. After the addition, the mixture was allowed to react at room temperature for 5 hours. The white precipitate thus formed was collected by filtration, thoroughly washed with dry methylene chloride, and dried to obtain aminoethylmethacrylamide hydrochloride. Then, 600 parts of ion-exchanged water, 10 parts of the resulting aminoethylmethacrylamide hydrochloride, and 1.0 part of an anionic surface active agent ("Perex OTP" produced by Kao Co., Ltd.) were charged in a flask equipped with a stirring blade and a tube for nitrogen introduction, followed by stirring. To the mixture was added 70 parts of methyl methacrylate to form an emulsion. To the emulsion was added 200 parts of a 3% aqueous solution of potassium persulfate, and the system was heated to 50° C., at which the emulsion was allowed to react for 24 hours. There were obtained fine particles of an aminoethylmethacrylamide hydrochloride/methyl methacrylate copolymer having an average particle size of 0.2 μm. The polymer particles were washed with water by means of a centrifugal separator. Then, 50.0 parts of the polymer particles was washed with a 5% sodium hydroxide aqueous solution to obtain fine particles of a methyl methacrylate copolymer having an amino group on the surface thereof.

Preparation of Capsule Particles

In a mixed solvent of 20 g of Isopar-H (produced by Exxon Chemical) and 40 g of ethyl acetate was dissolved 60 g of a lauryl methacrylate-styrene copolymer (weight average molecular weight: $9\times10^4$). To the solution were added 20 g of an isocyanate monomer "Sumidur L" (produced by Sumitomo Bayer Urethane Co., Ltd.) (second shell-forming monomer) and 20 g of ethyl acetate, followed by thoroughly mixing. The resulting liquid was designated liquid A.

Separately, 10 g of hydroxypropylmethyl cellulose "Metholose 60 SH 50" (produced by Shin-Etsu Chemical Industry Co., Ltd.) was dissolved in 400 g of ion-exchanged water, and 10 g of the above-prepared fine vinyl polymer particles was mixed therewith, followed by cooling to 5° C. The resulting liquid was designated liquid B.

Liquid B was agitated in an emulsifier "Autohomomixer" (manufactured by Tokushuki Kako K. K.), and liquid A was slowly poured therein to conduct emulsification to prepare an O/W emulsion of oil droplets having a mean particle size of about 12 μm. The emulsion was then stirred in a stirrer equipped with a propeller blade "Three-One Motor" (manufactured by Shinto Kagaku K. K.) at a speed of 400 rpm. Ten minutes later, 100 g of a 5% diethylenetriamine aqueous solution (first shell-forming monomer) was added thereto dropwise. After the dropwise addition, the mixture was heated to 60° C. for 3 hours to conduct encapsulation while driving out ethyl acetate. After completion of the reaction, the reaction mixture was poured into 2 l of ion-exchanged water, thoroughly stirred, and allowed to stand. After the capsule particles were sedimented, the supernatant liquor was removed. The above washing operation with ion-exchanged water was repeated 7 more times. There were thus obtained microcapsules whose outer shell comprised a mixture of the vinyl polymer prepared by emulsion polymerization and polyurea.

Evaluation of Capsule Particles

The resulting capsule suspension was spread in a stainless steel vat and dried in a drier (manufactured by Yamato Kagaku) at 60° C. for 10 hours and then sifted through a sieve of 80 μm. The resulting powdered microcapsules were subjected to a thermogravimetric analysis. As a result, the oil content in the capsules was found to be 16%. Then, the microcapsules were heated at 100° C. for 10 hours and similarly analyzed. As a result, the oil content was 14%. The microcapsules were thus proved excellent in retention of the core.

COMPARATIVE EXAMPLE 1

Comparative microcapsules were prepared in the same manner as in Example 1, except for using no vinyl polymer. The microcapsules were powdered and thermogravimetrically analyzed in the same manner as in Example 1. The oil content was found, as a result, to be 12%. After being heated at 100° C. for 10 hours, the oil content was reduced to 9%. It is thus seen that the comparative microcapsules were poor in retention of the core.

EXAMPLE 2

Preparation of Vinyl Polymer

In a flask equipped with a stirring blade and a tube for nitrogen introduction were charged 600 parts of ion-exchanged water and 1.0 part of an anionic surface active agent ("Perex CS" produced by Kao Co., Ltd.), followed by stirring. To the solution were added 70 parts of styrene and 5 parts of divinylbenzene to conduct emulsification. To the emulsion was added 200 parts of a 3% aqueous solution of potassium persulfate, and the system was heated to 50° C., at which the emulsion was allowed to react for 24 hours. There were obtained fine particles of a styrene polymer having an average particle size of 0.2 μm. The polymer particles were washed with water by means of a centrifugal separator. Then, 50.0 parts of the polymer particles was slowly poured into a mixture of 250 parts of concentrated sulfuric acid and 250 parts of concentrated nitric acid with stirring over a 30 minute period. After pouring, the mixture was allowed to react at 60° C. for 20 minutes. After completion of the reaction, the product was washed with 5,000 parts of ion-exchanged water to form a nitro group on the surface of the styrene polymer particles. Then, 45 parts of the nitrocontaining styrene polymer particles was added to 300 parts of a mixture comprising a solution of 190 parts of tin chloride in 1,000 parts of concentrated hydrochloric acid and 50 parts of methanol, followed by refluxing with stirring for 10 minutes to conduct reduction of the nitro group. After completion of the reduction reaction, the product was washed with 5000 parts of ion-exchanged water to obtain fine particles of a styrene polymer having an amino group on the surface thereof.

Preparation of Capsule Particles

In a mixed solvent of 30 g of Isopar-H and 40 g of ethyl acetate was dissolved 60 g of polylauryl methacrylate (weight average molecular weight: $5\times10^4$). To the solution was added 70 g of a magnetic powder whose surface having been rendered hydrophobic with a titanate coupling agent ("TTS" produced by Ajinomoto Co., Ind.), and the mixture was dispersed in a ball mill for 24 hours. To the dispersion were added 20 g of an isocyanate monomer "Sumidur L" (second shell-forming monomer) and 24 g of ethyl acetate, followed by thoroughly mixing. The resulting liquid was designated liquid A.

Separately, 10 g of hydroxypropylmethyl cellulose "Metholose 60 SH 50" was dissolved in 200 g of ion-exchanged water, and 10 g of the above-prepared fine styrene polymer particles was mixed therewith, followed by cooling to 5° C. The resulting liquid was designated liquid B.

Liquid B was agitated in an emulsifier "Autohomomixer", and liquid A was slowly poured therein to conduct emulsification to prepare an O/W emulsion of oil droplets having a mean particle size of about 12 μm. The emulsion was then stirred in a stirrer equipped with a propeller blade "Three-One Motor" at a speed of 400 rpm. Ten minutes later, 100 g of a 5% diethylenetriamine aqueous solution (first shell-forming monomer) was added thereto dropwise. After the dropwise addition, the mixture was heated to 60° C. for 3 hours to conduct encapsulation while driving out ethyl acetate. After completion of the reaction, the reaction mixture was poured into 2 l of ion-exchanged water, thoroughly stirred, and allowed to stand. After the capsule particles were sedimented, the supernatant liquor was removed. The above washing operation with ion-exchanged water was repeated 7 more times. There were thus obtained microcapsules whose outer shell comprised a mixture of the vinyl polymer prepared by emulsion polymerization and polyurea.

Evaluation of Capsule Particles

The resulting microcapsules were powdered and thermogravimetrically analyzed in the same manner as in Example 1. The oil content was found, as a result, to be 14%. After being heated at 100° C. for 10 hours, the microcapsules had an oil content of 13%. It is thus seen that the microcapsules were excellent in retention of the core.

COMPARATIVE EXAMPLE 2

Comparative microcapsules were prepared in the same manner as in Example 2, except for using no vinyl polymer. The microcapsules were powdered and thermogravimetrically analyzed in the same manner as in Example 1. The oil content was found, as a result, to be 11%. After being heated at 100° C. for 10 hours, the microcapsules had an oil content of 8%. It is thus seen that the comparative microcapsules were poor in retention of the core.

EXAMPLE 3

Preparation of Vinyl Polymer

In a flask equipped with a stirring blade and a tube for nitrogen introduction were charged 1,500 parts of ion-exchanged water and heated to 60° C. Twenty parts of diethylamino methacrylate and 60 parts of methyl methacrylate were added thereto while stirring. To the mixture were further added 20 parts 2,2'-azobis(2-amidinopropane) dihydrochloride ("V-50" produced by Wako Pure Chemical Ind. Ltd.) and 10 parts of 2,2'-azobis(2-methyl-N-( 1,1'-bis(hydroxymethyl)-2-hydroxyethyl)propionamide) ("V-080" produced by Wako Pure Chemical Ind. Ltd.), followed by heating to 65° C., at which the mixture was subjected to soap-free polymerization for 24 hours. After completion of the reaction, the fine particles thus produced were washed with 5000 parts of ion-exchanged water by means of a centrifugal separator to obtain fine particles of a diethylaminoethyl methacrylate/methyl methacrylate copolymer having an amidino hydrochloride group and a hydroxyl group on the surface thereof and having an average particle size of 0.5 μm.

Preparation of Capsule Particles

In a mixed solvent of 30 g of Isopar-H and 40 g of ethyl acetate was dissolved 60 g of polylauryl methacrylate (weight average molecular weight: $5\times10^4$). To the solution was added 70 g of a magnetic powder whose surface having been rendered hydrophobic with a titanate coupling agent "TTS", and the mixture was dispersed in a ball mill for 24 hours. To the dispersion were added 20 g of an isocyanate monomer "Sumidur L" (second shell-forming monomer), 10 g of an epoxy compound ("Epototo YD-8125" produced by Toto Kasei Co., Ltd.) (second shell-forming monomer), and 24 g of ethyl acetate, followed by thoroughly mixing. The resulting liquid was designated liquid A.

Separately, 10 g of hydroxypropylmethyl cellulose "Metholose 60 SH 50" was dissolved in 200 g of ion-exchanged water, followed by cooling to 5° C. The resulting liquid was designated liquid B.

Liquid B was agitated in an emulsifier "Autohomomixer", and liquid A was slowly poured therein to conduct emulsification to prepare an O/W emulsion of oil droplets having a mean particle size of about 12 μm. The emulsion was then stirred in a stirrer equipped with a propeller blade "Three-One Motor" at a speed of 400 rpm. Separately, 10 g of the above-prepared vinyl polymer fine particles was dispersed in 40 g of ion-exchanged water, and the dispersion was adjusted to a pH of 9 with sodium hydroxide. The dispersion was added to the above emulsion. Five minutes later, 100 g of a 5% diethylenetriamine aqueous solution (first shell-forming monomer) was added thereto dropwise over 10 minutes. After the dropwise addition, the mixture was heated to 60° C. for 3 hours to conduct encapsulation while driving out ethyl acetate. After completion of the reaction, the reaction mixture was poured into 2 l of ion-exchanged water, thoroughly stirred, and allowed to stand. After the capsule particles were sedimented, the supernatant liquor was removed. The above washing operation with ion-exchanged water was repeated 7 more times. There were thus obtained microcapsules whose outer shell comprised a mixture of the vinyl polymer prepared by soap-free polymerization and an epoxyurea polymer.

Evaluation of Capsule Particles

The resulting microcapsules were powdered in the same manner as in Example 1. Three grams of the powdered capsule toner and 100 g of an iron powder carrier were mixed at 20° C. and 50% RH to prepare a two-component developer. The chargeability of the resulting developer was evaluated by a blow-off method. As a result, the amount of charge was found to be +12 μC/g, indicating satisfactory positive chargeability.

COMPARATIVE EXAMPLE 3

Comparative microcapsules were prepared in the same manner as in Example 3, except for using no vinyl polymer. The microcapsules were powdered and mixed with a carrier in the same manner as in Example 3. The amount of charge as measured in the same manner as in Example 3 was +1 μC/g, indicating no substantial chargeability.

EXAMPLE 4 ps Preparation of Vinyl Polymer

In a flask equipped with a stirring blade and a tube for nitrogen introduction were charged 600 parts of ion-exchanged water and 1.0 part of an anionic surface active agent ("Perex CS" produced by Kao Co., Ltd.), followed by stirring. To the solution were added 70 parts of trifluoroethyl methacrylate to conduct emulsification. To the emulsion was added 200 parts of a 3% aqueous solution of potassium persulfate, and the system was heated to 50° C., at which the emulsion was allowed to react for 24 hours. There were obtained fine particles of trifluoroethyl methacrylate polymer having an average particle size of 0.2 μm. The polymer particles were washed with water by means of a centrifugal separator.

Preparation of Capsule Particles

In a mixed solvent of 30 g of Isopar-H and 40 g of ethyl acetate was dissolved 60 g of polylauryl methacrylate (weight average molecular weight: $5\times10^4$). To the solution was added 70 g of a magnetic powder whose surface having been rendered hydrophilic with a titanate coupling agent ("TTS" produced by Ajinomoto Co., Ind.), and the mixture was dispersed in a ball mill for 24 hours. To the dispersion were added 20 g of an isocyanate monomer "Sumidur L" (second shell-forming monomer) and 24 g of ethyl acetate, followed by thoroughly mixing. The resulting liquid was designated liquid A.

Separately, 10 g of hydroxypropylmethyl cellulose "Metholose 60 SH 50" was dissolved in 200 g of ion-exchanged water, and 10 g of the above-prepared fine trifluoroethyl methacrylate polymer particles was mixed therewith, followed by cooling to 5° C. The resulting liquid was designated liquid B.

Liquid B was agitated in an emulsifier "Autohomomixer", and liquid A was slowly poured therein to conduct emulsification to prepare an O/W emulsion of oil droplets having a mean particle size of about 12 μm. The emulsion was then stirred in a stirrer equipped with a propeller blade "Three-One Motor" at a speed of 400 rpm. Ten minutes later, 100 g of a 5% diethylenetriamine aqueous solution (first shell-forming monomer) was added thereto dropwise. After the dropwise addition, the mixture was heated to 60° C. for 3 hours to conduct ecapsulation while driving out ethyl acetate. After completion of the reaction, the reaction mixture was poured into 2 l of ion-exchanged water, thoroughly stirred, and allowed to stand. After the capsule particles were sedimented, the supernatant liquor was removed. The above washing operation with ion-exchanged water was repeated 7 more times. There were thus obtained microcapsules whose outer shell comprised a mixture of the vinyl polymer prepared by emulsion polymerization and polyurea.

Evaluation of Capsule Particles

The resulting capsules suspension was spread in a stainless steel vat and dried in a drier (manufactured by Yamato Kagaku) at 60° C. for 10 hours and then sifted through a sieve of 80 μm. Three grams of the resulting powdered microcapsules and 100 g of an iron powder carrier were mixed at 20° C. and 50% RH to prepare a two-component developer. The chargeability of the resulting developer was evaluated by a blow-off method. As a result, the amount of charge was found to be −12 μC/g, indicating satisfactory negative chargeability.

EXAMPLE 5

Preparation of Vinyl Polymer

In a flask equipped with a stirring blade and a tube for nitrogen introduction were charged 1,500 parts of ion-exchanged water and heated to 60° C. Twenty parts of diethylamino methacrylate and 60 parts of methyl methacrylate were added thereto while stirring. To the mixture were further added 20 parts 2,2'-azobis(2-amidinopropane) dihydrochloride ("V-50" produced by Wako Pure Chemical Ind. Ltd.) and 10 parts of 2,2'-azobis(2-methyl-N-( 1,1'-bis(hydroxymethyl)-2-hydroxyethyl)propionamide) ("V-080" produced by Wako Pure Chemical Ind. Ltd.), followed by heating to 65° C., at which the mixture was subjected to soap-free polymerization for 24 hours. After completion of the reaction, the fine particles thus produced were washed with 5,000 parts of ion-exchanged water by means of a centrifugal separator to obtain fine particles of a diethylaminoethyl methacrylate/methyl methacrylate copolymer having an amidino hydrochloride group and a hydroxyl group on the surface thereof and having an average particle size of 0.5 μm.

Preparation of Capsule Particles

One gram of a polymerization initiator ("V-65" produced by Wako Pure Chemical Ind., Ltd.) was dissolved in 40 g of styrene monomer, and 40 g of lauryl methacrylate monomer and 20 g of polylauryl methacrylate (weight average molecular weight: $5\times10^4$) and 30 g of Isopar-H were added thereto, followed by dissolving. To the resulting solution were added 70 g of a magnetic powder whose surface having been rendered hydrophilic with a titanate coupling agent "TTS", and the mixture was dispersed in a ball mill for 24 hours. To the dispersion was added 20 g of an isocyanate monomer ("Takenate D110N" produced by Takeda Chemical Industries, Ltd.) (second shell-forming monomer), followed by thoroughly mixing. The resulting liquid was designated liquid A.

Separately, 10 g of hydroxypropylmethyl cellulose "Metholose 60 SH 50" was dissolved in 200 g of ion-exchanged water, followed by cooling to 5° C. The resulting liquid was designated liquid B.

Liquid B was agitated in an emulsifier "Autohomomixer", and liquid A was slowly poured therein to conduct emulsification to prepare an O/W emulsion of oil droplets having a mean particle size of about 12 μm. The emulsion was then stirred in a stirrer equipped with a propeller blade "Three-One Motor" at a speed of 400 rpm. Separately, 10 g of the above-prepared vinyl polymer fine particles was dispersed in 40 g of ion-exchanged water, and the dispersion was adjusted to a pH of 9 with sodium hydroxide. The dispersion was added to the above emulsion. Five minutes later, 100 g of a 5% diethylenetriamine aqueous solution (first shell-forming monomer) was added thereto dropwise over 10 minutes. After the dropwise addition, the mixture was heated to 40° C. for 3 hours to conduct encapsulation. Next, the mixture was heated to 80° C. for 10 hours while stirring to allow the core material polymerized. After completion of the reaction, the reaction mixture was poured into 2 l of ion-exchanged water, thoroughly stirred, and allowed to stand. After the capsule particles were sedimented, the supernatant liquor was removed. The above washing operation with ion-exchanged water was repeated 7 more times. There were thus obtained microcapsules whose outer shell comprised a mixture of the vinyl polymer prepared by soap-free polymerization and a urea polymer.

Evaluation of Capsule Particles

The resulting capsules suspension was spread in a stainless steel vat and dried in a drier (manufactured by Yamato Kagaku) at 60° C. for 10 hours and then sifted through a sieve of 80 μm. Three grams of the resulting powdered microcapsules and 100 g of an iron powder carrier were mixed at 20° C. and 50% RH to prepare a two-component developer. The chargeability of the resulting developer was evaluated by a blow-off method. As a result, the amount of charge was found to be +12 μC/g, indicating satisfactory positive chargeability. The cross section of the toner particle was observed with a transmission electron microscope, and it was found that the vinyl polymer was present in the capsulae shell in the form of particles.

According to the present invention, the core material can be sufficiently covered in an outer shell, and a special function, such as charge controllability, can easily be imparted to microcapsules. Where the microcapsule of the present invention is applied as a capsule toner, there can easily be obtained a capsule toner having satisfactory chargeability with reduced dependence on environmental conditions. Further, an encapsulation step and a step for imparting charge controllability can be effected simultaneously. In addition, the process of the present invention is of improved safety, is suitable for the production of microcapsules having a liquid core, and requires no special apparatus.

While the invention has been described in detail and with reference to specific examples thereof, it will be apparent to one skilled in the art that various changes and modifications can be made therein without departing from the spirit and scope thereof.

What is claimed is:

1. A microcapsule comprising a core material and an outer shell, said outer shell containing a vinyl polymer and a polymer comprising at least two monomers copolymerizable with each other on the surface of said core material, wherein said vinyl polymer is vinyl polymer fine particles and said outer shell is a shell comprising said polymer and said vinyl polymer.

2. A microcapsule as claimed in claim 1, wherein said vinyl polymer is a vinyl polymer having active hydrogen, and said vinyl polymer and said polymer are chemically bonded to each other.

3. A microcapsule as claimed in claim 1, wherein said vinyl polymer is dissolved in said polymer.

4. A microcapsule as claimed in claim 1, wherein said polymer comprises at least one member selected from the group consisting of polyurea, polyurethane, polyamide, and an epoxy polymer.

5. A microcapsule as claimed in claim 1, wherein said polymer has a polyurea structure.

6. A microcapsule comprising a core material and an outer shell, said outer shell containing a vinyl polymer having active hydrogen and a polymer comprising at least two monomers copolymerizable with each other on the surface of said core material, wherein said vinyl polymer is vinyl polymer fine particles and said vinyl polymer and said polymer are chemically bonded to each other.

7. A microcapsule toner comprising a core material, an outer shell and a colorant, said outer shell containing a vinyl polymer and a polymer comprising at least two monomers copolymerizable with each other on the surface of said core material, wherein said vinyl polymer is vinyl polymer fine particles.

8. A microcapsule toner according to claim 7 wherein said vinyl polymer has active hydrogen, said polymer has a polyurea structure and said vinyl polymer and said polymer are chemically bonded to each other.

9. A microcapsule comprising a core material and an outer shell, prepared by a process comprising the steps of:

emulsifying a lipophilic core material in an aqueous medium to form an emulsion; and causing at least two monomers copolymerizable with each other to copolymerize, in the presence of a vinyl polymer, on the surface of oil droplets of said core material in said emulsion to form an outer shell wherein said vinyl polymer is vinyl polymer fine particles.

10. A microcapsule according to claim 9, wherein one of said monomers is present in said lipophilic core material and the other monomer is in said aqueous medium.

11. A microcapsule according to claim 9, wherein all of said monomers are present in said lipophilic core material.

12. A microcapsule according to claim 9, wherein said core material contains a low boiling point solvent capable of dissolving or swelling said outer shell.

13. A microcapsule according to claim 9, wherein one of said monomers is selected from the group consisting of an isocyanate compound, an acid halide, and an epoxy compound.

14. A microcapsule according to claim 9, wherein said vinyl polymer is a vinyl polymer having active hydrogen on the surface thereof.

* * * * *